United States Patent
Roux

[11] Patent Number: 6,028,888
[45] Date of Patent: Feb. 22, 2000

[54] SINGLE-CHANNEL AND MULTI-CHANNEL COHERENT DEMODULATION DEVICES WITH NO PILOT SIGNAL, AND CORRESPONDING RECEIVING SYSTEM USING A PLURALITY OF DIVERSITY PATHS

[75] Inventor: Pierre Roux, Argenteuil, France

[73] Assignee: Alcatel, Paris, France

[21] Appl. No.: 09/129,899

[22] Filed: Aug. 6, 1998

[30] Foreign Application Priority Data

Aug. 7, 1997 [FR] France ................................ 97 10131

[51] Int. Cl.[7] .......................................... H04K 1/00
[52] U.S. Cl. ............................................. 375/208; 370/208
[58] Field of Search .................................. 375/200, 206, 375/208, 326; 370/206, 208, 209, 342

[56] References Cited

U.S. PATENT DOCUMENTS

| | | | |
|---|---|---|---|
| 4,841,544 | 6/1989 | Nuytkens . | |
| 5,103,459 | 4/1992 | Gilhousen et al. . | |
| 5,233,626 | 8/1993 | Ames ........................................ | 375/200 |
| 5,459,473 | 10/1995 | Dempster et al. ........................ | 375/200 |
| 5,799,010 | 8/1998 | Lomp et al. ............................. | 375/208 |

FOREIGN PATENT DOCUMENTS

| | | |
|---|---|---|
| 0647046A1 | 4/1995 | European Pat. Off. . |
| 0675606A1 | 10/1995 | European Pat. Off. . |
| 0762700A2 | 3/1997 | European Pat. Off. . |

*Primary Examiner*—Tesfaldet Bocure
*Attorney, Agent, or Firm*—Sughrue, Mion, Zinn, Macpeak & Seas, PLLC

[57] ABSTRACT

Coherent demodulation is effected in single-channel and multi-channel coherent demodulation devices without any knowledge of the transmitted signal (i.e. without any pilot signal). The phase shift is estimated by applying a predetermined function to produce a signed value from the argument of a summed signal, the summed signal being itself obtained from the received signal (by quadrature demodulation, complex despreading and summing over N samples). The phase shift estimate is used in a phase-locked loop so that the system converges towards a null error. The residual static phase ambiguity introduced by application of the predetermined function is resolved. A plurality of such single-channel and multi-channel coherent demodulation devices is used in a receiving system using a plurality of diversity paths.

14 Claims, 7 Drawing Sheets

Fig. 5

SINGLE-CHANNEL AND MULTI-CHANNEL COHERENT DEMODULATION DEVICES WITH NO PILOT SIGNAL, AND CORRESPONDING RECEIVING SYSTEM USING A PLURALITY OF DIVERSITY PATHS

BACKGROUND OF THE INVENTION

1. Field of the Invention

The field of the invention is that of digital transmission with frequency spreading, and in particular, although not exclusively, CDMA (Code Division Multiple Access) transmission. The CDMA technique, which consists in multiplying a source signal (included in a common frequency band) by means of a specific code, constitutes one application of frequency spreading.

2. Description of the Prior Art

In transmission systems of the above kind, frequency spreading modulation devices are generally used for transmission. They apply to input signals (source signals) frequency spreading followed by quadrature modulation to obtain the signals to be transmitted. Conventionally (and this applies in the remainder of the present description), the input signal or each input signal is deemed to have a bit rate D while the signal to be transmitted and the received signal each have a bit rate N*D, where N is the spreading factor.

The invention is more precisely concerned with coherent demodulation devices of the type for regenerating, from the signals received, the input signals of the aforementioned frequency spreading modulation devices.

In the context of the present invention, only complex frequency spreading (corresponding to the use of two spreading sequences in quadrature) is of interest. Real spreading (corresponding to the use of a single spreading sequence) has an inherent performance handicap such that it is of no interest.

Two families of frequency spreading transmission are generally recognized:

- single-channel transmission: the modulation device receives a single input signal to which it applies frequency spreading followed by quadrature modulation to generate the signal to be transmitted; and
- multi-channel transmission: the modulation device receives a plurality of input signals and multiplies each of them by a separate orthogonal code (a Walsh code, for example) to obtain a plurality of channels. It combines this plurality of channels onto a single multi-channel signal to which it applies frequency spreading and then quadrature modulation to obtain the signal to be transmitted.

In each of these two families, it is possible to distinguish two sub-families, respectively corresponding to the situations in which the input signal, or each input signal, is real or complex. A complex input signal at bit rate D generally results from passing a real signal at bit rate 2.D through a 1 to 2 serial/parallel converter.

The invention has many applications, for example in digital cellular mobile radio systems.

In cellular systems, single-channel transmission is typically used only for an uplink (mobile station to base station) channel where the mobile station is supposedly satisfied with the existence of a single communication channel to the base station. A plurality of mobile stations can each transmit in "single-channel mode" in the same frequency band. Because they use different spreading sequences or different phases of a common spreading sequence the base station can separate out the signals transmitted by the various mobile stations.

Moreover, in cellular systems, multi-channel transmission is typically used in the case of a downlink (base station to mobile station) channel where the base station has to communicate with a plurality of mobile stations. The signal transmitted by the base station is then an aggregate of several channels broadcast to all the mobile stations. These channels are separated by the use of codes known as "orthogonal" codes in that they enable a mobile station receiver to extract the channel addressed to it without this being impeded by the presence of other channels.

However, the current trend in standardizing future CDMA type cellular networks is to introduce multi-channel transmission in the uplink (mobile station to base station) direction as well. This trend is justified by the resulting flexibility (in particular for multimedia applications) and by the possibility of adopting coherent demodulation (offering higher performance than the non-coherent demodulation that has to be used in multi-channel receiving devices).

The existing demodulation techniques (with their respective drawbacks) are described below for each of the two transmission families previously mentioned.

First, it should be remembered that a demodulation (or receiving) device has the task or regenerating the input (source) signal or signals from the signal that it receives. The signal received corresponds to the signal transmitted affected by various disturbances. The type of disturbance of interest here is a phase shift. After the received signal is demodulated (using two carriers in quadrature), the resulting demodulated signal is a complex signal subject to a phase rotation. This rotation corresponds precisely to the phase shift. The phase shift is known to be due to the propagation medium and to the modulation and demodulation operations (and in particular due to the asynchronism of the local oscillators feeding the modulator and the demodulator). The phase shift varies in time, i.e. it is a dynamic phenomenon. The treatment of the phase shift varies for single-channel and multi-channel transmission.

In the case of single-channel transmission, non-coherent demodulation is currently used, which has repercussions for the receiver as well as for the transmitter. The principle of non-coherent demodulation is to choose a transmitted sequence that can be interpreted at the receiver without knowing the phase shift due to the channel.

Unfortunately, adopting non-coherent demodulation leads to a performance handicap.

In the case of multi-channel transmission, coherent demodulation is currently used, which presupposes a knowledge of the varying phase shift introduced by transmission, modulation and demodulation. The current solution to the problem of acquiring this knowledge consists in dedicating one channel to the transmission of a pilot signal. In other words an all "one" signal is generally transmitted as one of the input signals. The receiver exploits the presence of the pilot signal to estimate the channel and in particular to determine the phase shift due to the channel. Once it knows this, the receiver can cancel the phase shift.

Unfortunately, using a pilot signal also reduces system performance. The channel carrying the pilot signal is not available for transmitting data. Also, the pilot signal channel often has to have a higher power rating than a normal channel, in particular if the dynamic variations are fast. This surplus transmitted power does not convey any information and so link performance is degraded.

An objective of the invention is to alleviate the various drawbacks of the prior art.

To be more precise, one objective of the present invention is to provide a single-channel coherent demodulation device usable in the case of single-channel transmission and offering better performance than the conventional non-coherent demodulation devices referred to above.

Another objective of the invention is to provide a multi-channel coherent demodulation device usable in the case of multi-channel transmission and offering better performance than the conventional coherent demodulation devices using a pilot signal referred to above.

Another objective of the invention is to provide single-channel and multi-channel coherent demodulation devices of the above kind adapted to estimate and to correct the phase shift induced by the propagation medium in particular without using any hypothesis as to the transmitted signals and in particular without transmission of any pilot signal.

A complementary objective of the invention is to provide a receiving system using a plurality of diversity paths which retains the advantages associated with the (single-channel or multi-channel) devices included in the system.

SUMMARY OF THE INVENTION

These various objectives, along with others that will become apparent hereinafter, are achieved in accordance with the invention with the aid of a single-channel coherent demodulation device for regenerating, from a received signal, an input signal of a single-channel Nth order complex spreading modulation device, said single-channel complex spreading modulation device applying to said input signal complex spreading followed by quadrature modulation to obtain a signal to be transmitted, said input signal having a bit rate D, said signal to be transmitted and said received signal each having a bit rate N*D, which device includes:

quadrature demodulation means generating a demodulated signal at bit rate N*D from said received signal;

complex despreading means generating a despread signal at bit rate N*D from said demodulated signal;

means for summing over N samples generating a summed signal at bit rate D from said despread signal;

a loop for estimating and correcting the phase shift induced in said demodulated signal, said loop comprising:

means for sampling the argument of said summed signal;

means for applying a predetermined function for moving the argument of the summed signal into a range of less than or equal to $-\pi/(2x)$ but less than $\pi/(2x)$, where x is equal to 1 or 2 according to whether said input signal is real or complex, the result of application of said predetermined function to said argument of the summed signal constituting an estimate of said phase shift;

means for subtracting said estimate of the phase shift from the phase of said demodulated signal or from that of said despread signal; and means for regenerating said input signal from said summed signal, themselves comprising means for resolving a residual static phase ambiguity induced by application of said predetermined function.

In the case of single-channel transmission, the general principle of the invention therefore consists in using coherent demodulation with no pilot signal, which has no effect on the transmitter and enables demodulation performance to be improved. It will be remembered that in the prior art non-coherent demodulation is used in this situation.

It is important to note that the coherent demodulation of the invention is effected without any knowledge of the transmitted signal. The phase shift is estimated by producing a signed value from the argument of the summed signal. To be more precise, a predetermined function, itself based on a modulo function, is applied to the summed signal to move the argument of the summed signal into a range around zero.

The estimated phase shift is used in a phase-locked loop (for example a first order loop). The system therefore converges towards a null error (i.e. perfect correction of the phase shift).

Note that application of the predetermined function leads to a residual static phase ambiguity, which must be resolved. However, phase ambiguity is a well-known phenomenon in systems without frequency spreading (non-CDMA systems), where it is associated with carrier recovery. Consequently, existing solutions to the problem of resolving phase ambiguity can be applied here. In any event, even if the solution adopted to the problem of resolving the phase ambiguity leads to slightly degraded performance, performance is only very slightly degraded in comparison to the use of non-coherent demodulation.

The invention also concerns a multi-channel coherent demodulation device for regenerating, from a received signal, a plurality of input signals of a multi-channel Nth order complex spreading modulation device, said multi-channel modulation device multiplying each of said input signals by a separate orthogonal code to obtain a plurality of channels, said plurality of channels being grouped on a common multi-channel signal, said multi-channel signal undergoing complex spreading followed by quadrature modulation to obtain a signal to be transmitted, each of said input signals having a bit rate D, said signal to transmit and said received signal each having a bit rate N*D, said multi-channel coherent demodulation device including:

quadrature demodulation means generating a demodulated signal at bit rate N*D from said received signal; and complex despreading means generating a despread signal at bit rate N*D from said demodulated signal;

a plurality of processing branches each associated with a given channel from said plurality and including:

means for multiplication of said despreading signal by the orthogonal code specific to said given channel to obtain a despread signal specific to said given channel at bit rate N*D; and means for summing over N samples generating a summed signal specific to said given channel at bit rate D from said despread signal specific to said given channel;

a loop for estimating and correcting the phase shift induced in said demodulated signal, said loop comprising:

in each of said processing branches:

means for sampling the argument of said summed signal specific to said given channel;

means for applying a predetermined function to move the argument of the summed signal specific to said given channel into a range of less than or equal to $-\pi/(2x)$ but less than $\pi/(2x)$ where x is equal to 1 or 2 according to whether said input channel of said given channel is real or complex, the result of application of said predetermined function to said argument of the summed signal specific to said given channel constituting an estimate of said phase shift;

means for averaging estimates of said phase shift supplied by said processing branches to obtain an average estimate of said phase shift; and means for subtracting said average estimate of the phase-shift from the phase of said demodulated signal or from that of said despreading signal; and in each of said processing branches, means for regenerating said input signal of said given channel from said summed signal specific to said given channel, themselves comprising means for resolving a residual static phase ambiguity induced by application of said predetermined function.

In the case of multi-channel transmission, the general principle of the invention is to use coherent demodulation with no pilot signal. It will be remembered that in the prior art coherent demodulation with a pilot signal is used in this case.

The foregoing comments (referring to the single-channel device) on the coherent demodulation of the invention apply equally to the multi-channel device.

The multi-channel device of the invention is distinguished from the aforementioned single-channel device essentially in that the phase shift is estimated on each summed signal specific to a given channel. All these estimates are used to calculate an average estimate which is used for global correction of the phase of the received signal. A residual static phase ambiguity has to be resolved in respect of each summed signal specific to a given channel.

A number of features common to the multi-channel and single-channel coherent demodulation devices of the invention will now be described.

Said predetermined function is preferably written: $f(\Phi) = ((\Phi + \pi/(2.x))\%(\pi/x)) - \pi/(2.x)$, where % is the "modulo" function.

It will be remembered that x is equal to 1 or 2 according to whether said input signal is real or complex.

Said loop advantageously further comprises at least some of the means from the group comprising:

means for multiplying said estimate of the phase shift or said average estimate of the phase shift by a predetermined scalar quantity to adjust the dynamic characteristics of said loop; and means for integrating said estimate of the phase shift or said average estimate of the phase shift over a predetermined time period to obtain a cumulative estimate of said phase shift.

Said input signal or each of said input signals advantageously belongs to the group comprising:

the real input signals at bit rate D (x=1); and the complex input signals at bit rate D (x=2), each generated by a 1 to 2 serial/parallel converter from a real source signal at bit rate 2*D.

It is clear that in terms of bit rate it is preferable to use complex input signals.

Said means for regenerating the input signal or each of said input signals advantageously further comprise at least some of the means belonging to the group comprising:

means for sampling the real part if said input signal is a real signal;

threshold means; and

Viterbi decoding means if convolutional encoding means are used by the transmitter.

In one particular embodiment of the invention said means for resolving a residual static phase ambiguity comprise differential encoding/decoding means.

Note that this solution entails multiplication of the error rate (by a ratio of two or less) leading to slightly degraded performance. However, performance is degraded only very slightly in comparison to the use of differential (non-coherent) demodulation.

In an advantageous variant, where convolutional encoding means are used by the transmitter and said means for regenerating the input signal comprise Viterbi decoding means, said means for resolving a residual static phase ambiguity comprise:

phase shifting means for shifting the phase of the signal at the input of said Viterbi coding means by a value chosen from a predetermined set of values; and means for analyzing the signal at the output of said Viterbi decoding means, indicating to said phase shifter means the choice of one of the phase shift values according to the result of said analysis.

This variant applies in particular (but not exclusively) when the convolutional code employed is not transparent to phase ambiguities. If there is no transparency, the previous solution (differential encoding/decoding) is inapplicable. In this case, this non-transparency can be used to implement the present variant which is not subject to the multiplication of errors phenomenon mentioned above. In the situation where the residual phase ambiguity is non-null, analyzing the output signal of the decoder (for example comparing the cumulative metric to a predetermined threshold) detects if the value chosen for the phase shift is the correct one. By trying the various possible phase shift values (by a trial and error process), the best value is determined, which amounts to resolving the phase ambiguity.

In this particular embodiment, or in this variant, said predetermined set of phase shift values comprises the following values:

0 and $\pi$ if said input signal or each of said input signals is a real signal; or 0, $\pi/2$, $\pi$ or $3\pi/2$ if said input signal or each of said input signals is a complex signal.

The invention also concerns a receiving system comprising at least two single-channel or multi-channel coherent demodulation devices of the invention each corresponding to a separate diversity path, and, for said input signal or for each of said input signals, means for regenerating said input signal from summed signals supplied by the summing means of each of said diversity paths, wherein said regeneration means comprise:

means for combining said summed signals to obtain a final combined signal having a maximum gain; and means for resolving the residual static phase ambiguity of said final combined signal, induced by the application, on each of said diversity paths, of said predetermined function.

In accordance with the invention, the receiving system first determines a combined signal (resulting from the combination of the signals associated with the various parts) so that it has a maximum gain and then resolves the phase ambiguity of this combined signal. The gain is measured by measuring the absolute value, for example.

It will be remembered that in systems using diversity resolving the phase ambiguity is slightly complicated because the ambiguity must be resolved on each diversity path. Unless measures are implemented to prevent it, there is the risk of combining paths in phase opposition rather than in phase.

Said means for combining the various summed signals advantageously comprise $n_G$ groups of means in cascade where $n_G = n_S - 1$, where $n_S$ is the number of summed signals to be combined ($n_S \geq 2$), each group of means comprising:

phase shifter means for shifting the phase of a first of said summed signals or of a combined signal at the output of a preceding group of means by a value chosen from a predetermined set of values to generate a phase shifted summed signal;

means for adding said phase shifted summed signal to another of said summed signals to generate a combined signal; and means for controlling said phase shifter means assuring a final choice of the phase shift value such that the combined signal has a maximal gain, a group of means receiving the combined signal generated by the preceding group of means only when said control means of said preceding group of means have effected said final choice, the combined signal generated by the final group of means constituting said final combined signal.

Thus the first path is combined with the second, after which the third is combined with the signal resulting from combining the first two, and so on.

Other features and advantages of the invention will become apparent on reading the following description of one preferred embodiment of the invention given by way of illustrative and non-limiting example, and from the accompanying drawings.

BRIEF DESCRIPTION OF THE DRAWINGS

FIGS. 1A through 1D each show a block schematic of a conventional frequency spreading modulation device for the following types of transmission:

single-channel with complex spreading of a real signal (FIG. 1A);

single-channel with complex spreading of a complex signal (FIG. 1B);

multi-channel with complex spreading of a real signal (FIG. 1C);

multi-channel with complex spreading of a complex signal (FIG. 1D).

DETAILED DESCRIPTION OF THE PREFERRED EMBODIMENTS

Figure 1A:
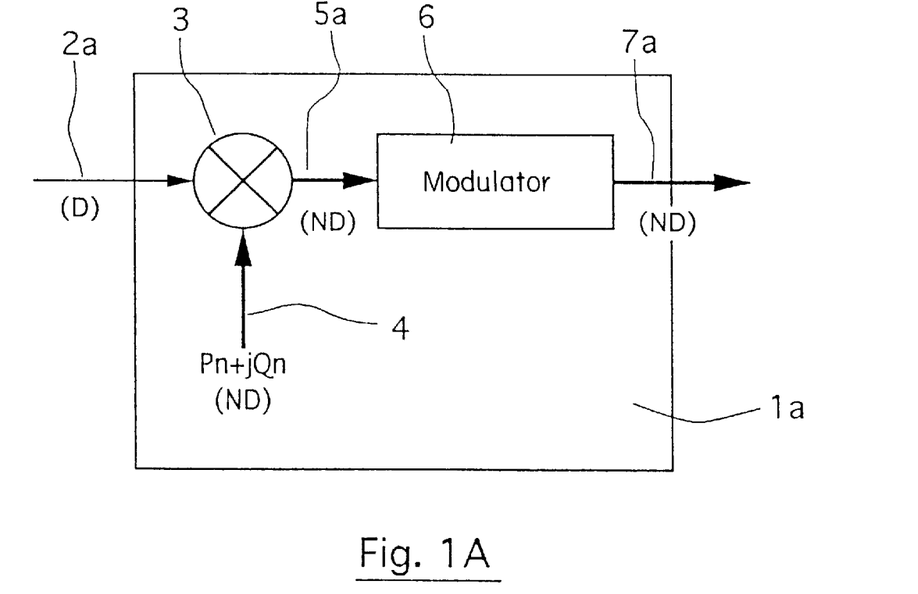
Figure 1B:
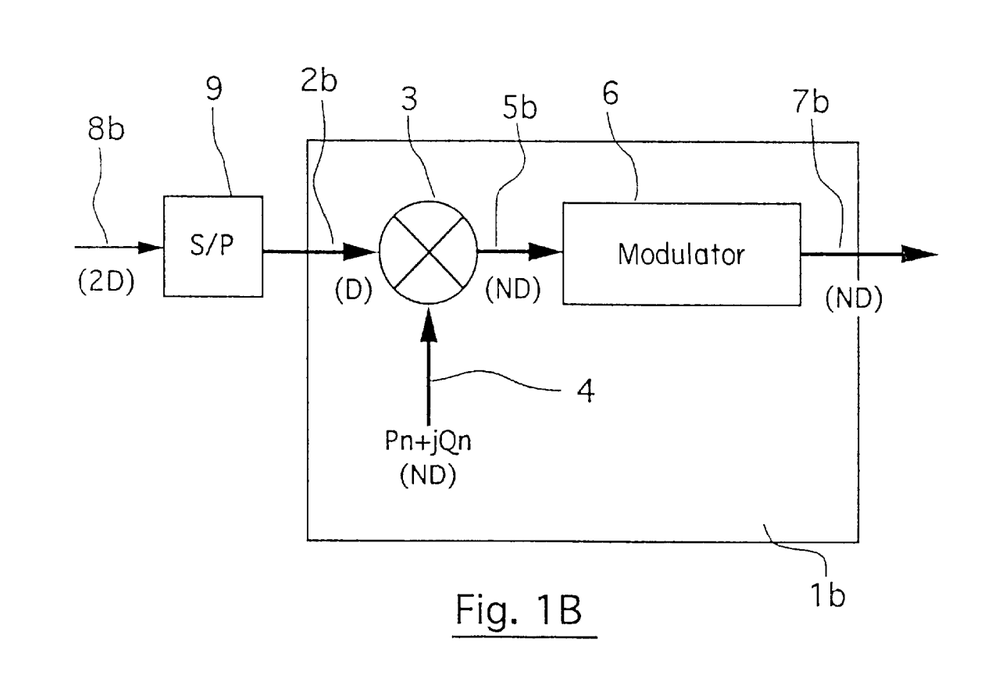
Figure 1C:
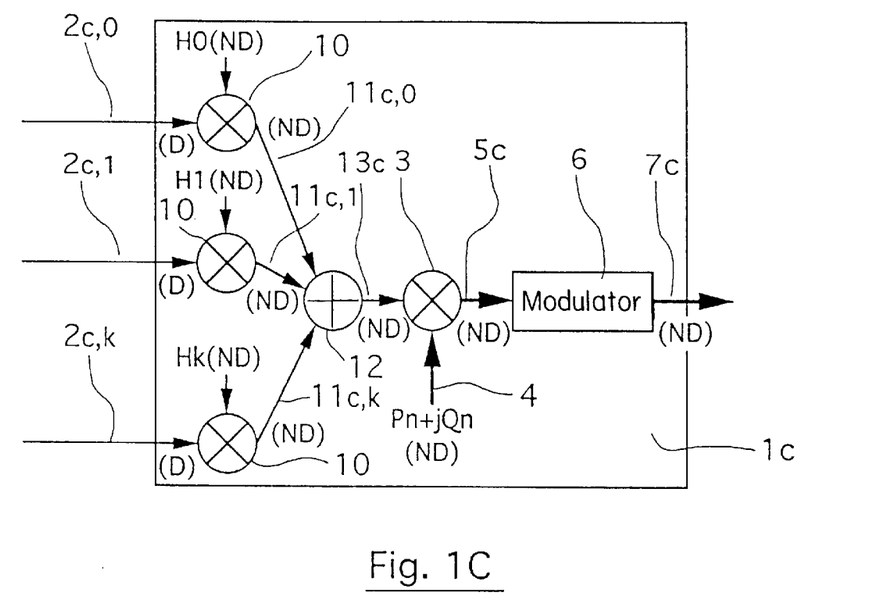
Figure 1D:
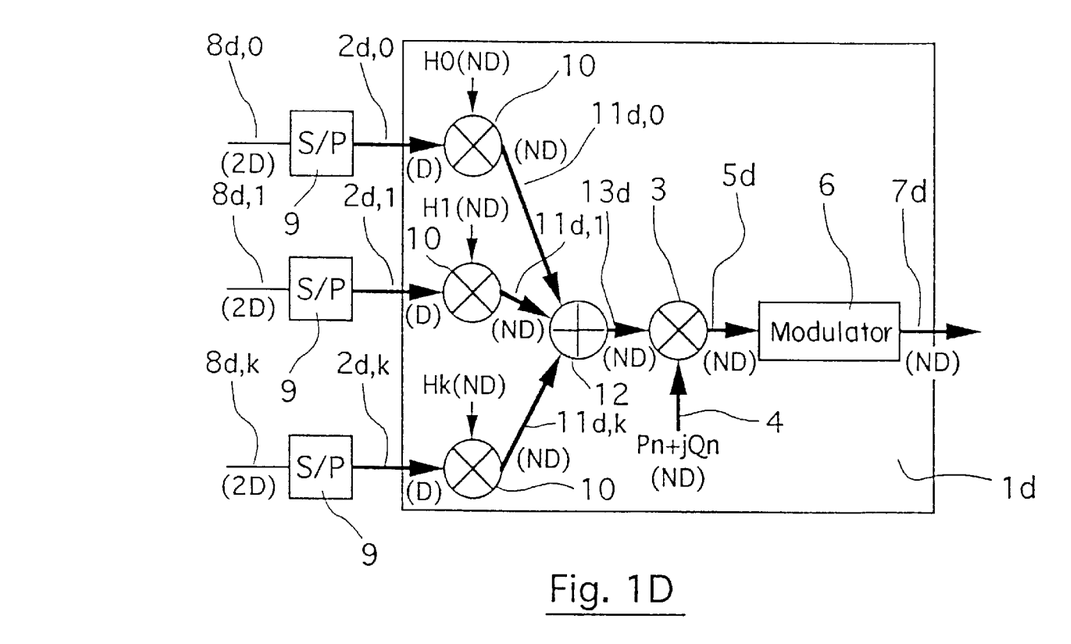

The various types of frequency spreading transmission will now be briefly described with reference to FIGS. 1A through 1D. FIGS. 1A and 1B correspond to single-channel transmission, respectively when the input signal is real (FIG. 1A) or complex (FIG. 1B). FIGS. 1C and 1D correspond to the case of multi-channel type transmission, respectively when the input signals are real (FIG. 1C) or complex (FIG. 1D).

The convention adopted in all the figures is that real signals are represented by thin lines and complex signals are represented by thick lines. Also, the same item is associated with the same reference number in all the figures.

In the case of single-channel transmission with complex spreading of a real signal (FIG. 1A), the frequency spreading modulation device $1_a$ receives a single input signal $2_a$ assumed to be a digital signal made up of digital bit stream at bit rate D. A spread signal $5_a$ is obtained by multiplication (3) of the input signal $2_a$ by a complex signal 4 denoted (Pn+j Qn). Pn and Qn are two pseudo-random bit streams at bit rate N*D where N is the spreading factor. The spread signal $5_a$, which is a complex signal at bit rate N*D, is fed to two inputs of a modulator 6 using two carriers in quadrature. The output signal of the modulator 6, also at bit rate N*D, constitutes the signal $7_a$ to be transmitted.

In the case of single-channel transmission with complex spreading of a complex signal (FIG. 1B), the frequency spreading modulation device $1_b$ differs from that of FIG. 1A only in that the input signal $2_b$ is complex and not real. The complex input signal $2_b$ at bit rate D results (for example) from passing a real source signal $8_b$ at bit rate 2.D through a 1 to 2 series/parallel converter 9.

In the case of multi-channel transmission with complex spreading of a real signal (FIG. 1C), the frequency spreading modulation device $1_c$ receives a plurality of input signals $2_{c,0}$ through $2_{c,k}$. Each of these input signals $2_{c,0}$ through $2_{c,k}$ is multiplied (10) by a separate orthogonal code H0 through Hk (a Walsh code, for example) to obtain a plurality of channels $11_{c,0}$ through $11_{c,k}$. This plurality of channels $11_{c,0}$ through $11_{c,k}$ is grouped (12) onto a common multi-channel signal $13_c$. A spread signal $5_c$ is obtained by multiplication (3) of the multi-channel signal $13_c$ by a complex signal 4 denoted Pn+j Qn. The spread signal $5_c$, which is a complex signal at bit rate N*D, is fed to two inputs of a modulator 6 using two carriers in quadrature. The output signal of the modulator 6, also at bit rate N*D, constitutes the signal $7_c$ to be transmitted.

In the case of multi-channel transmission with complex spreading of a complex signal (FIG. 1D), the frequency spreading modulation device $1_d$ differs from that of FIG. 1C only in that each of the input signals $2_{d,0}$ through $2_{d,k}$ is complex and not real. Each of the complex input signals $2_{d,0}$ through $2_{d,k}$ at bit rate D results (for example) from passing a real source signal from a plurality $8_{d,0}$ through $8_{d,k}$ of such signals at bit rate 2.D through a series/parallel converter 9.

Four embodiments of a coherent demodulation device of the invention, respectively corresponding to the four types of transmission of FIGS. 1A through 1D, will now be described with reference to FIGS. 2A through 2D.

Figure 2A:
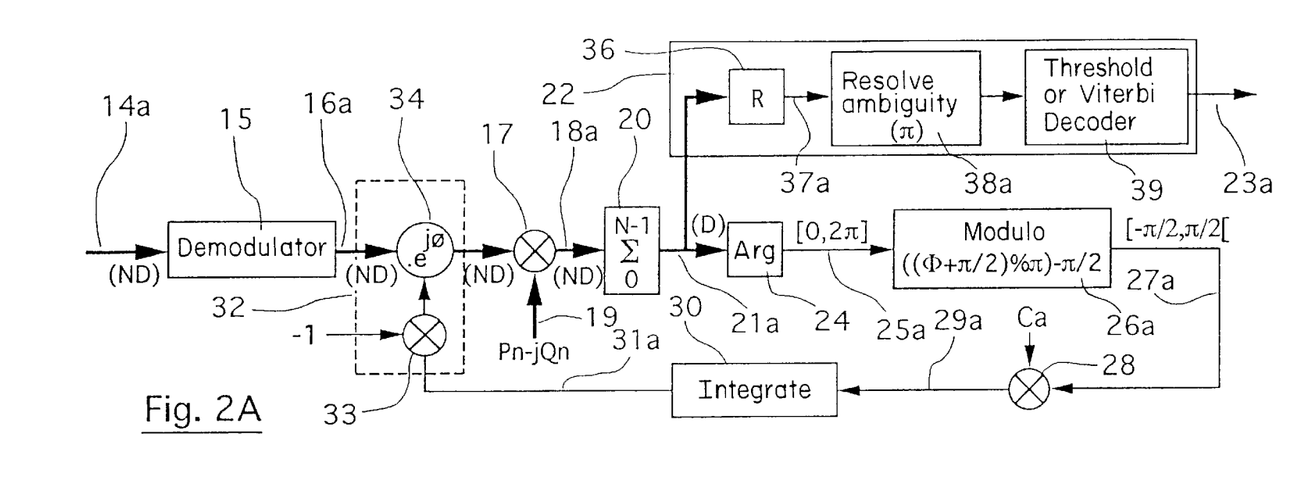
FIGS. 2A through 2D each show a block schematic of one particular embodiment of a demodulation device of the invention, for the respective transmission types from FIGS. 1A through 1D.

In the first embodiment shown in FIG. 2A the single-channel coherent demodulation device receives a signal $14_a$ resulting from the transmission through a given propagation medium of the signal $7_a$ output by the modulation device $1_a$ from FIG. 1A.

This first embodiment of the coherent demodulation device includes:

a quadrature demodulator 15 generating a demodulated signal $16_a$ (at bit rate N*D) from the received signal $14_a$;

complex despreading means 17 generating a despread signal $18_a$ (at bit rate N*D) from the demodulated signal $16_a$. This complex despreading is effected by multiplication by the complex signal 19, denoted (Pn−j Qn), conjugate with the signal 4 used for the spreading;

means 20 for summing over N samples, generating a summed signal $21_a$ (at bit rate D) from the despread signal $18_a$;

a phase shift estimation and correction loop (see detailed description below). It will be remembered that the phase shift is induced in the demodulated signal $16_a$ in particular by modulation, transmission via the propagation medium and demodulation;

means 22 for regenerating the input signal $2_a$ from the summed signal $21_a$ (see detailed description below). With perfect regeneration the regenerated signal $23_a$ is equal to the input signal $2_a$ (FIG. 1A).

In the example shown in FIG. 2A, the phase shift estimation and correction loop comprises:

means 24 for sampling the argument $25_a$ of the summed signal $21_a$. The argument $25_a$ is in the range of less than or equal to 0 but less than $2\pi$ means $26_a$ for applying a predetermined function to move the argument $25_a$ of the summed signal $21_a$ into the range of less than or equal to $-\pi/2$ but less than $\pi/2$. The signed value obtained in this way constitutes a raw estimate $27_a$ of the phase shift. In this case, the predetermined function is written (for example): $f_a(\Phi)=((\Phi+\pi/2)\%\pi)-\pi/2$, where % is the "modulo" function;

means 28 for multiplying the raw estimate $27_a$ of the phase shift by a predetermined scalar quantity (loop coefficient) $c_a$ to adjust the dynamic characteristics of the loop;

means 30 for integrating the resulting signal $29_a$ (at the output of the multiplication means 28) over a predetermined duration to obtain a cumulative phase shift estimate $31_a$;

means 32 for subtracting the phase of the demodulated signal $16_a$ from the cumulative estimate $31_a$. This subtraction is effected by multiplication (33) of the cumulative estimate $31_a$ by −1 (to obtain the opposite of the cumulative estimate) and then multiplication (34) of the demodulated signal $16_a$ by $e^{j\Phi}$, where $\phi$ is the opposite of the cumulative phase shift estimate $31_a$.

Note that, in one variant, the cumulative estimate $31_a$ can be subtracted from the phase of the despread signal $18_a$ (and not from the phase of the demodulated signal $16_a$) as the order of execution of the demodulation and despreading operations can be reversed because they are linear operations.

In the example shown in FIG. 2A, the regeneration means 22 comprise:

means 36 for sampling the real part $37_a$ of the summed signal $21_a$;

means $38_a$ for resolving a residual static phase ambiguity of the real part $37_a$ of the summed signal $21_a$ caused by application of the function $f_a(\Phi)$ to the argument $25_a$ of the summed signal $21_a$. In the present case, the input signal being a real signal, the residual static phase shift can be equal to 0 or $\pi$. In other words, the phase ambiguity is $\pi$ (see detailed description of these ambiguity resolving means below);

processing means 39 (for example threshold means or Viterbi decoding means) for obtaining the regenerated signal $23_a$ after the phase ambiguity has been resolved. Clearly Viterbi decoding can be applied only if convolutional encoding means are used by the transmitter.

Figure 3:
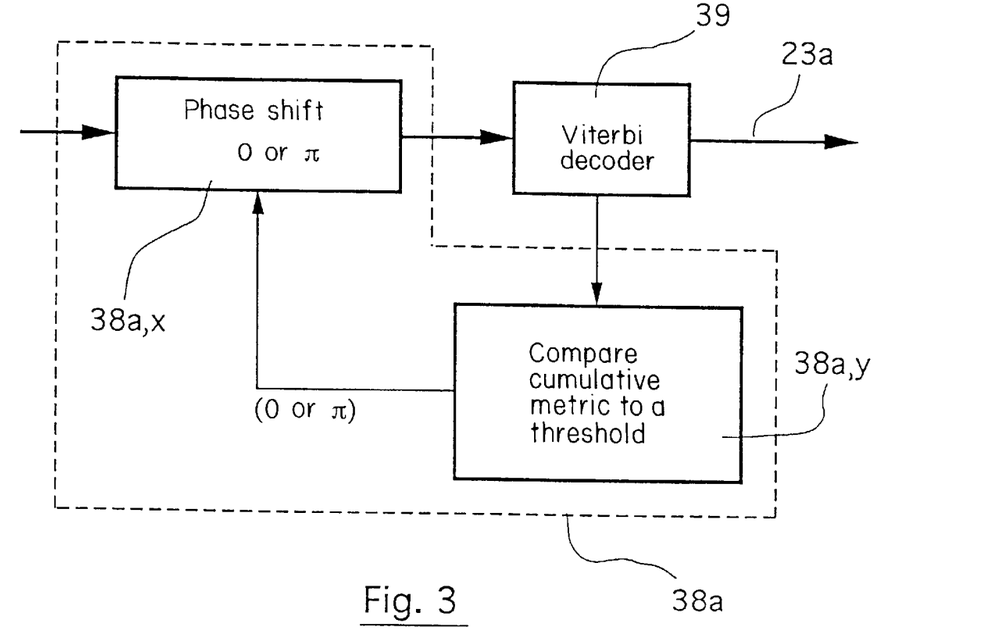
FIGS. 3 and 4 each show a simplified schematic of a preferred embodiment of the means for resolving a residual static phase ambiguity, respectively as shown in FIGS. 2A and 2C on the one hand and in FIGS. 2B and 2D on the other hand.

One particular embodiment of the means $38_a$ for resolving a residual static phase ambiguity will now be described with reference to FIG. 3. This particular embodiment applies in particular if convolutional encoding means (not shown) are used at the transmitting end, if the means 22 for regenerating the input signal comprise Viterbi decoding means 39, and in the situation where the encoding scheme employed is not transparent to phase ambiguities. In this particular embodiment, the means $38_a$ for resolving a residual static phase ambiguity comprise:

phase shifter means $38_{a,x}$ for shifting by 0 or by $\pi$ the phase of the signal at the input of the Viterbi decoding means 39; and means $38_{a,y}$ for analyzing the signal $23_a$ at the output of the Viterbi decoding means 39 indicating to the phase shifter means $38_{a,x}$ the choice of one of the phase shift values (0 or $\pi$) according to the result of the analysis.

The aforementioned analysis ($38_{a,y}$) consists, for example, in comparing the cumulative metric of the signal 23 to a predetermined threshold. If the residual static phase shift is equal to 0, the Viterbi decoder operates normally. On the other hand, if the residual phase shift is equal to $\pi$, abnormally high cumulative metrics are observed at the output of the Viterbi decoder, higher than in the maximal case of disturbance. When this is observed, the phase of the signal fed to the input of the Viterbi decoder is modified by introducing a phase shift of $\pi$. This resolves the residual static phase ambiguity.

Clearly other types of residual static phase ambiguity resolving means can be envisaged that do not depart from the scope of the present invention. Accordingly, in one variant, the residual static phase ambiguity resolving means comprise differential encoding/decoding means.

Figure 2B:
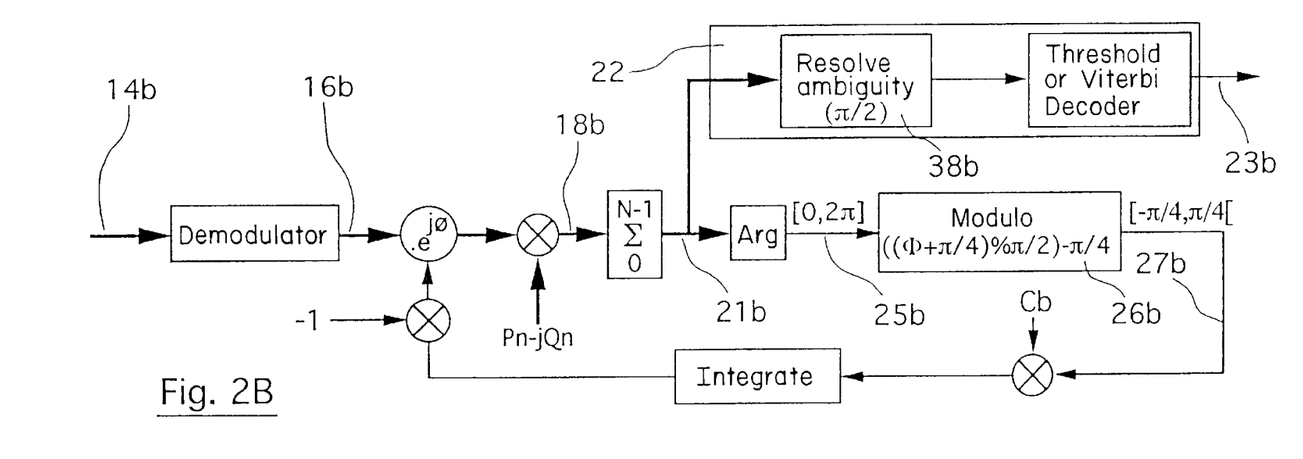

In the second embodiment shown in FIG. 2B, the coherent demodulation device is of the single-channel type and receives a signal $14_b$ resulting from the transmission through a given propagation medium of the signal $7_b$ output by the modulation device $1_b$ of FIG. 1B.

This second embodiment differs from the first embodiment (see FIG. 2A) essentially in that:

the regeneration means 22 do not comprise any means for sampling the real part of the summed signal $21_b$, because the regenerated signal $23_b$ to be obtained is a complex signal. It will be remembered that in the case of perfect regeneration the regenerated signal $23_b$ is equal to the input signal $2_b$ (FIG. 1B);

in the phase estimation and correction loop, the predetermined function (applied by the means $26_b$) moves the argument $25_b$ of the summed signal $21_b$ into the range of less than or equal to $-\pi/4$ but less than $\pi/4$. The signed value obtained in this way constitutes a raw estimate $27_b$ of the phase shift. In this case, the predetermined function is written (for example): $f_b(\Phi)=((\Phi+\pi/4)\%\pi/2)-\pi/4$, where % is the "modulo" function;

the means $38_b$ for resolving a residual static phase ambiguity are slightly different from those of FIG. 1A because the input signal is a complex signal and so the residual static phase shift can be equal to 0, $\pi/2$, $\pi$ or $3\pi/2$. In other words, the phase ambiguity is $\pi/2$ (it is $\pi$ for a real input signal).

Figure 4:
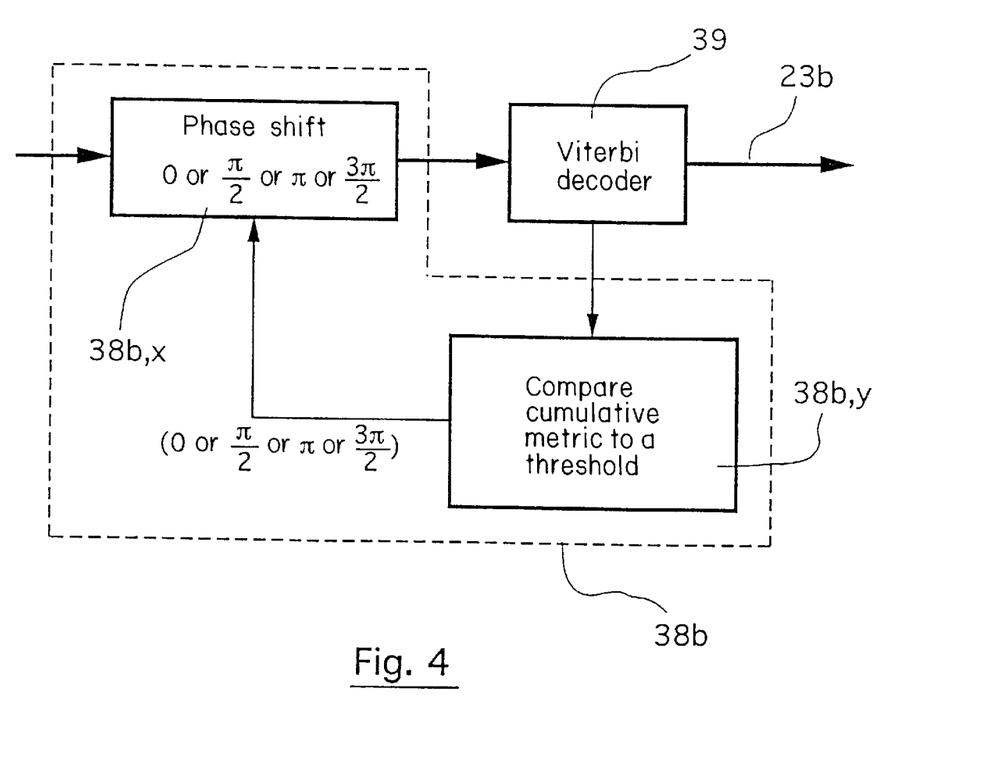

FIG. 4 shows one particular embodiment of the means $38_b$ for resolving the residual static phase ambiguity. This embodiment is evidently deduced directly from that described hereinabove with reference to FIG. 3. All that is required is to replace the set of phase shift values $\{0, \pi\}$ with the set $\{0, \pi/2, \pi, 3\pi/2\}$.

Figure 2C:
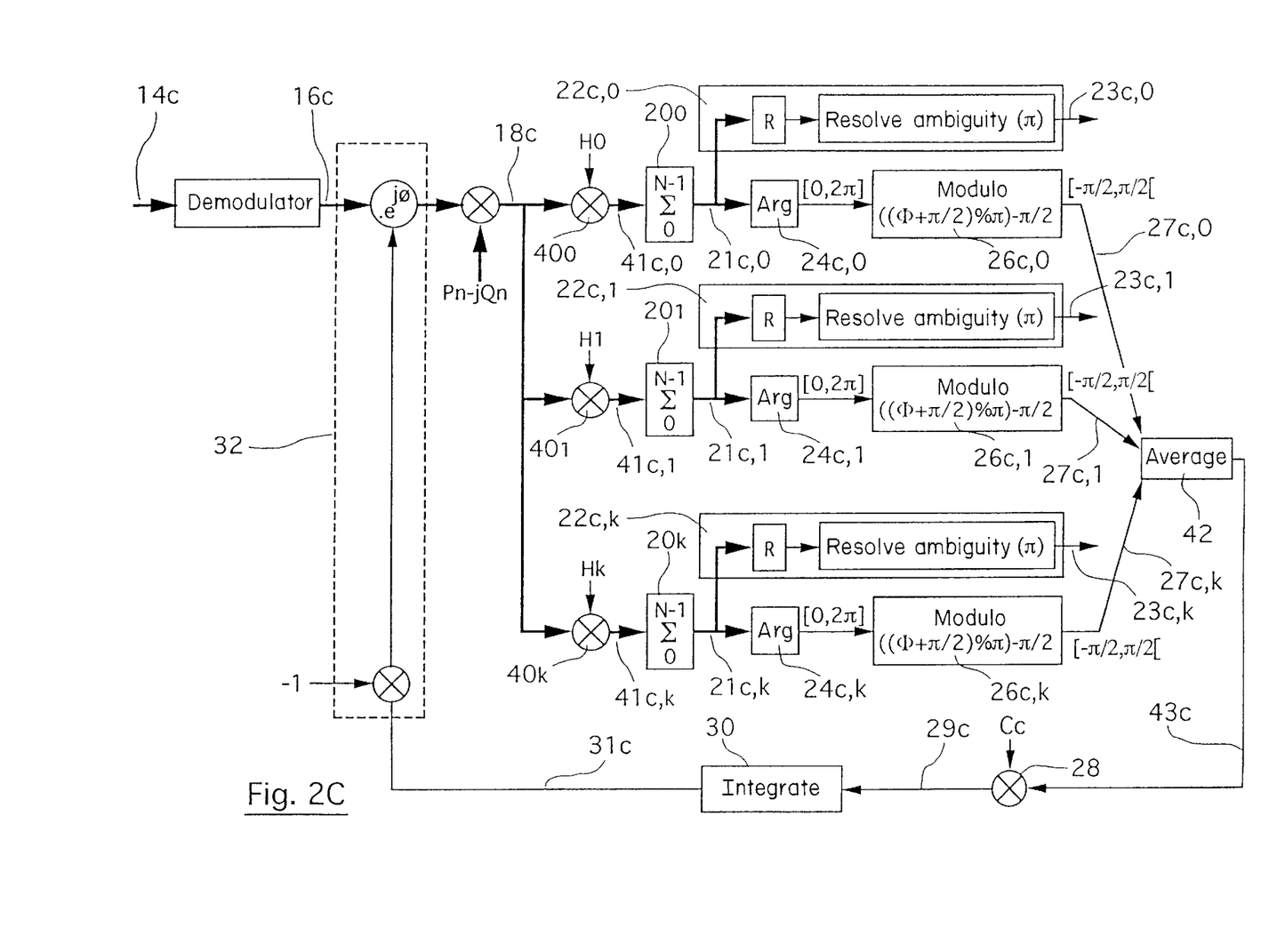

In the third embodiment shown in FIG. 2C, the coherent demodulation device is of the multi-channel type and receives a signal $14_c$ resulting from the transmission through a given propagation medium of the signal $7_c$ output by the modulation device $1_c$ from FIG. 1C.

As in the first embodiment (FIG. 2A), a despread signal $18_a$ is generated, after passing through a quadrature demodulator 15 and then despreading means 17.

On the other hand, this third embodiment includes a plurality of branches for processing the despread signal $18_a$. Each branch is associated with a given one of k+1 channels and includes (for the ith branch, for example) with $0 \leq i \leq k$:

means $40_i$ for multiplying the despread signal $18_c$ by the orthogonal code Hi specific to the channel concerned to obtain a despread signal $41_{c,i}$ specific to the channel concerned at bit rate N*D;

means $20_i$ for summing over N samples, generating a summed signal $21_{c,i}$ specific to the channel concerned, at bit rate D, from the despread signal $41_{c,i}$ specific to the channel concerned;

means $22_{c,i}$ for regenerating the input signal $2_{c,i}$ of the channel concerned from the summed signal $21_{c,i}$ specific to the channel concerned. With perfect regeneration the regenerated signal $23_{c,i}$ is equal to the input signal $2_{c,i}$ (FIG. 1C).

The aforementioned summing means $20_i$ and regeneration means $22_{c,i}$ are identical to those 20 and 22, respectively, of the first embodiment and therefore have already been described above, with reference to FIG. 2A. Note that it is merely for simplicity that the regeneration means $22_{c,i}$ in FIG. 2C do not include the processing means 39 from FIG. 2A.

In this third embodiment, the phase shift estimation and correction loop comprises:

in each processing branch (for example the ith branch, with $0 \leq i \leq k$), means $24_{c,i}$ for sampling the argument of the summed signal $21_{c,i}$ specific to the channel concerned and means $26_{c,i}$ for moving the argument of the summed signal $21_{c,i}$ specific to the channel concerned into the range of less than or equal to $-\pi/2$ but less than $\pi/2$. The signed value obtained in this way constitutes a raw estimate $27_{c,i}$ of the phase shift. The means $24_{c,i}$ and $26_{c,i}$ are identical to those 24 and 26, respectively, of the first embodiment and therefore have already been described above, with reference to FIG. 2A;

means 42 for averaging the raw estimates $27_{c,i}$ of the phase shift supplied by the various processing branches to obtain an average phase shift estimate $43_c$;

means 28 for multiplying the average estimate $43_a$ of the phase shift by a predetermined scalar quantity (loop coefficient) $c_c$ to adjust the dynamic characteristics of the loop;

means 30 for integrating the resulting signal $29_c$ (at the output of the multiplication means 28) over a predetermined duration to obtain a cumulative phase shift estimate $31_c$; and means 32 for subtracting the cumulative estimate $31_c$ of the phase shift from the phase of the demodulated signal $16_c$ (or, in a variant, from that of the despread signal $18_c$).

The aforementioned multiplication means 28, integration means 30 and subtraction means 32 have already been described above, with reference to FIG. 2A.

Figure 2D:
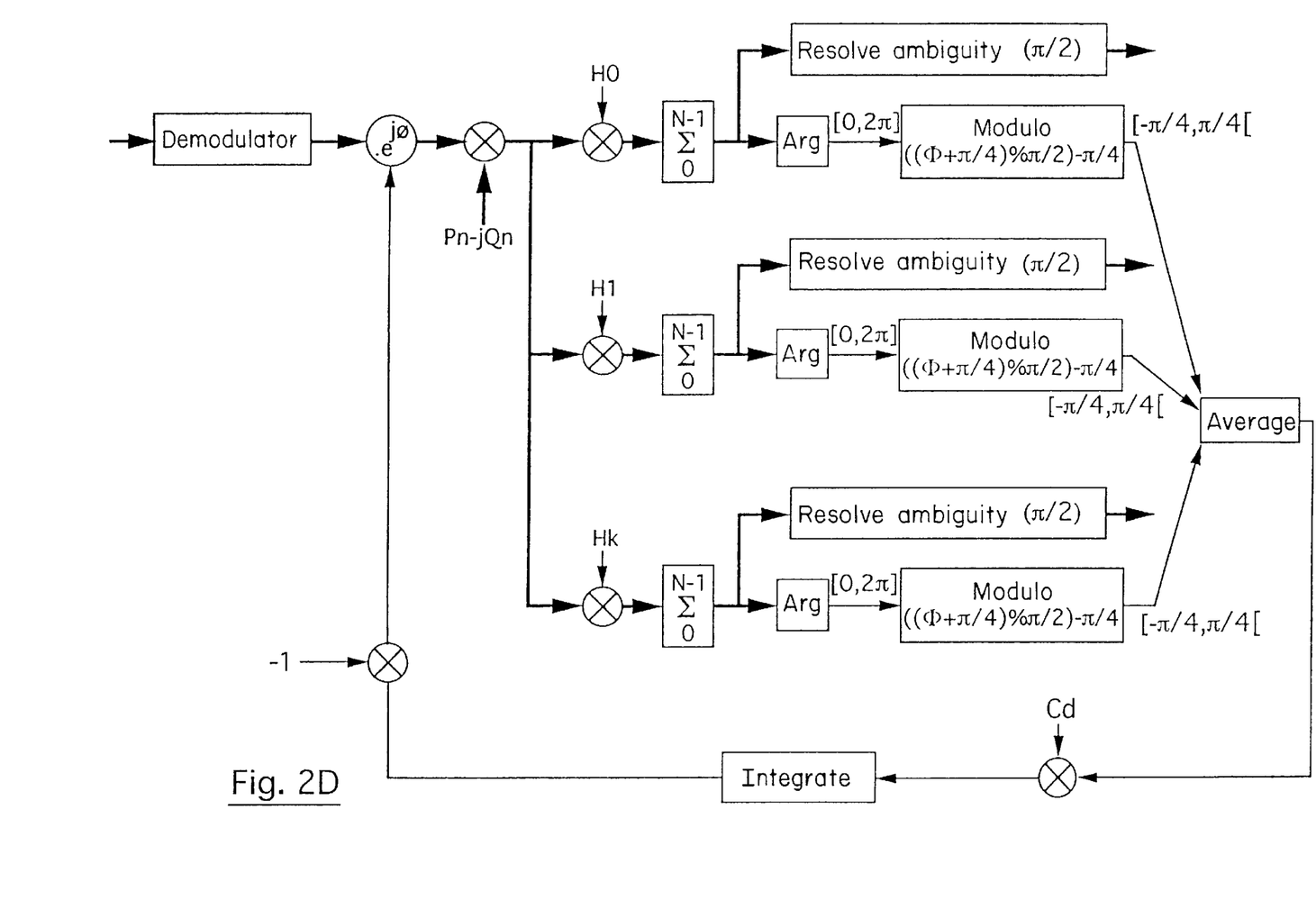

In the fourth embodiment shown in FIG. 2D the coherent demodulation device is of the multi-channel type and receives a signal $14_d$ resulting from the transmission through a given propagation medium of the signal $7_d$ output by the modulation device $1_d$ from FIG. 1D.

This fourth embodiment is deduced from the third embodiment in the same way as the second embodiment is deduced from the first embodiment. It therefore does not require a specific description.

One particular embodiment of a receiving system in accordance with the invention using a plurality of diversity paths will now be described with reference to FIG. 5. It will be remembered that, with a receiving system of this kind, there are generally as many sources of static phase ambiguities as there are paths. Steps must therefore be taken to avoid the risk of combining the various paths in phase opposition. Means specific to the invention enabling in-phase combination of the various diversity paths are specifically described below.

The receiving system is a "RAKE" type receiver, for example, which exploits the multipath phenomenon to introduce diversity gain. The multipath phenomenon is present when the signal received by the receiver has taken different paths associated with different electrical time delays. The "RAKE" type receiver attempts to realign the various components in time and then to combine them "in phase" to obtain a maximum gain. It is assumed here that the various diversity paths have already been realigned in time.

In the particular embodiment described here, the receiving system comprises three single-channel devices in accordance with the second embodiment described above (with reference to FIG. 2B). In other words, there are three diversity paths on the single channel, each of the three coherent demodulation devices receiving a signal $14_b$, $14_b'$, $14_b''$ resulting from the transmission through a given propagation medium of the signal $7_b$ output by the modulation device $1_b$ from FIG. 1B.

The receiving system therefore comprises three phase-locked loops identical to that from FIG. 2B, one for each of the three coherent demodulation devices.

The receiving system also comprises means 50 for regenerating the input signal $2_b$ from the various summed signals S0 through S2 supplied by the summing means 20 of each of the three coherent demodulation devices. Note that in FIG. 2B the summed signal (to which each of the summed signals S0 through S2 corresponds) is denoted $21_b$. With perfect regeneration the regenerated signal 21 is equal to the input signal $2_b$ (FIG. 1A).

The regeneration means 50 comprise:

means 52 for combining the various summed signals S0 through S2 in phase to obtain a final combined signal 53 having a maximal gain (see detailed description below);

means 54 for resolving the residual static phase ambiguity of the final combined signal 53, induced by the application of the predetermined function $f_b(\Phi)$ on each of said diversity paths; and means 55 (for example of the threshold or Viterbi decoder type) for processing the signal output by the means 54 for resolving the phase ambiguity of the combined final signal to obtain the regenerated signal 51.

Figure 5:
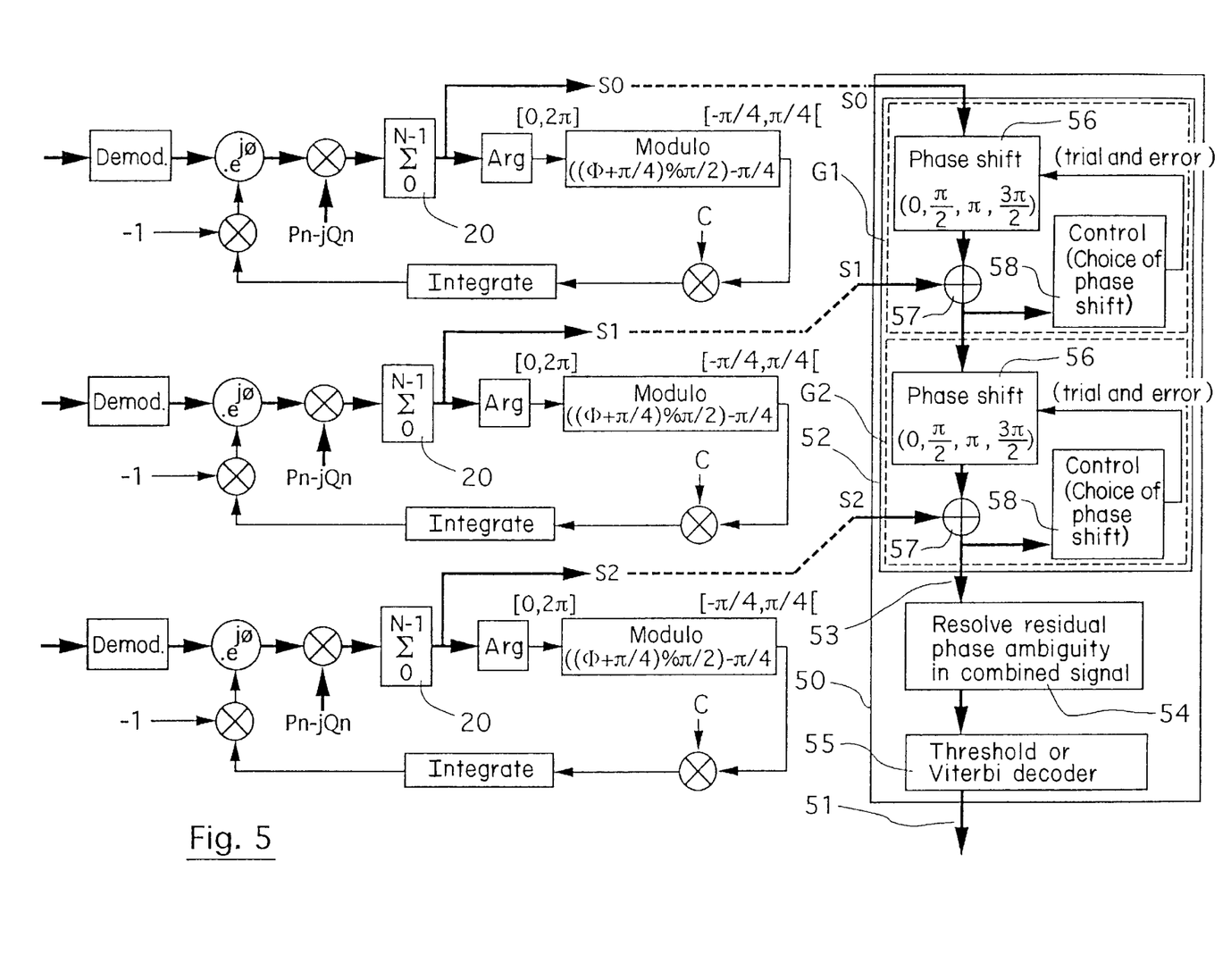
FIG. 5 shows a block schematic of a particular embodiment of a receiving system in accordance with the invention using a plurality of diversity paths.

In the FIG. 5 embodiment, the combination means 52 comprise $n_G$ (=2) groups G1, G2 of means in cascade. Generally, $n_G=n_S-1$, where $n_S$ is the number of summed signals to be combined ($n_S=2$ in the example shown). Each group G1, G2 of means comprises:

phase shifter means 56 for shifting by 0, $\pi/2$, $\pi$ or $3\pi/2$ the phase of the first summed signal S0 (first group G1) or of a combined signal $S_c$ present at the output of one of the preceding groups of means (second group G2, for example) to generate a phase shifted summed signal $S_d$;

means 57 for adding the phase shifted summed signal $S_d$ with another one of the various summed signals to generate a combined signal $S_c$; and means 58 for controlling the phase shifter means 56 to assure a final choice of phase shift value (0, $\pi/2$, $\pi$ or $3\pi/2$) such that the combined signal $S_c$ has a maximal gain (for example, a maximal absolute value after summation (57)). This can be done by trial and error.

The combined signal $S_c$ generated by the last group G2 of means constitutes the combined final signal 53.

In operation, a group G1, G2 of means receives the combined signal $S_c$ generated by the preceding group of means only when the control means 58 of the preceding group of means have made their final choice.

To summarize, with the first group G1, the first and second summed signals S0, S1 are combined. Then, with the second group G2, the previous combination (of the first and second summed signals S0, S1) is combined with the third summed signal S2.

The principle can therefore be generalized to a larger number of summed signals (i.e. a larger number of paths). At each step, path n is added to the sum of paths n−1 assigned a static phase shift chosen in the range {0, π/2, π, 3π/2}.

Additionally, it is a simple matter to go from the above example (where the input signal is a complex signal) to the situation where the input signal is a real signal. It is sufficient to replace the set of phase shift values {0, π/2, π, 3π/2} with the set {0, π}.

From the foregoing description it is clear that the invention can also be generalized to the situation in which the receiving system comprises any number (≧2) of coherent demodulation devices with no pilot signal.

Similarly, the coherent demodulation devices in the receiving system can be implemented in accordance with any of the other three embodiments described above (with reference to FIGS. 2A, 2C and 2D, respectively).

Note that for generalization to the situation in which the coherent demodulation devices are of the multi-channel type (third and fourth embodiments, FIG. 2C and FIG. 2D), the explanations given with reference to FIG. 5 (for the situation in which the coherent demodulation devices are of the single-channel type) must be applied to each channel. Path diversity applies in the multi-channel situation to each of the channels.

There is claimed:

1. A single-channel coherent demodulation device for regenerating, from a received signal, an input signal of single-channel Nth order complex spreading modulation device, said single-channel complex spreading modulation device applying to said input signal complex spreading followed by quadrature modulation to obtain a signal to be transmitted, said input signal having a bit rate D, said signal to be transmitted and said received signal each having a bit rate N*D, which device includes:

quadrature demodulation means generating a demodulated signal at bit rate N*D from said received signal;

complex despreading means generating a despread signal at bit rate N*D from said demodulated signal;

means for summing over N samples generating a summed signal at bit rate D from said despread signal;

a loop for estimating and correcting the phase shift induced in said demodulated signal, said loop comprising:

means for sampling the argument of said summed signal;

means for applying a predetermined function for moving the argument of the summed signal into a range of less than or equal to −π/(2x) but less than π(2x), where x is equal to 1 or 2 according to whether said input signal is real or complex, the result of application of said predetermined function to said argument of the summed signal constituting an estimate of said phase shift;

means for subtracting said estimate of the phase shift from the phase of said demodulated signal or from that of said despread signal; and regenerating means for regenerating said input signal from said summed signal, said regenerating means comprising means for resolving a residual static phase ambiguity induced by application of said predetermined function.

2. A multi-channel coherent demodulation device for regenerating, from a received signal, a plurality of input signals of a multi-channel Nth order complex spreading modulation device, said multi-channel modulation device multiplying each of said input signals by a separate orthogonal code to obtain a plurality of channels, said plurality of channels being grouped on a common multi-channel signal, said multi-channel signal undergoing complex spreading followed by quadrature modulation to obtain a signal to be transmitted, each of said input signals having a bit rate D, said signal to transmit and said received signal each having a bit rate N*D, said multi-channel coherent demodulation device including:

quadrature demodulation means generating a demodulated signal at bit rate N*D from said received signal;

complex despreading means generating a despread signal at bit rate N*D from said demodulated signal;

a plurality of processing branches each associated with a given channel from said plurality of channels and including:

means for multiplication of said despreading signal by the orthogonal code specific to said given channel to obtain a despread signal specific to said given channel at bit rate N*D; and means for summing over N samples generating a summed signal specific to said given channel at bit rate D from said despread signal specific to said given channel;

a loop for estimating and correcting the phase shift induced in said demodulated signal, said loop comprising:

means in each of said processing branches for sampling the argument of said summed signal specific to said given channel;

means in each of said processing branches for applying a predetermined function to move the argument of the summed signal specific to said given channel into a range from −π/(2x) to π/2x), where x is equal to 1 or 2 according to whether said input channel of said given channel is real or complex, the result of application of said predetermined function to said argument of the summed signal specific to said given channel constituting an estimate of said phase shift;

means for averaging estimates of said phase shift supplied by said processing branches to obtain an average estimate of said phase shift; and means for subtracting said average estimate of the phase-shift from the phase of said demodulated signal or from that of said despreading signal; and in each of said processing branches, regenerating means for regenerating said input signal of said given channel from said summed signal specific to said given channel, said regenerating means comprising means for resolving a residual static phase ambiguity induced by application of said predetermined function.

3. The device claimed in claim 1 wherein said predetermined function can be written: f(Φ)=((Φ+π/(2.x))%(π/x))−π/(2.x), where % is the "modulo" function.

4. The device claimed in claim 2 wherein said loop further comprises at least some of the means belonging to a group comprising:

means for multiplying said estimate of the phase shift or said average estimate of the phase shift by a predetermined scalar quantity to adjust the dynamic characteristics of said loop; and means for integrating said estimate of the phase shift or said average estimate of the phase shift over a predetermined time period to obtain a cumulative estimate of said phase shift.

5. The device claimed in claim 1 wherein said input signal belongs to the group comprising:

the real input signals at bit rate D (x=1); and the complex input signals at bit rate D (x=2), each generated by a 1 to 2 serial/parallel converter from a real source signal at bit rate 2*D.

6. The device claimed in claim 1 wherein said means for resolving a residual static phase ambiguity comprise differential encoding/decoding means.

7. The device claimed in claim 1, convolutional encoding means being used by the transmitter, said means for regenerating the input signal comprising Viterbi decoding means, wherein said means for resolving a residual static phase ambiguity comprise:

phase shifting means for shifting the phase of the signal at the input of said Viterbi decoding means by a value chosen from a predetermined set of values; and means for analyzing the signal at the output of said Viterbi decoding means, indicating to said phase shifter means the choice of one of the phase shift values according to the result of said analysis.

8. The device claimed in claim 7 wherein said predetermined set of phase shift values comprises the following values:

0 and $\pi$ if said input signal or each of said input signals is a real signal; or 0, $\pi/2$, $\pi$ or $3\pi/2$ if said input signal or each of said input signals is a complex signal.

9. The device claimed in claim 1 wherein said regenerating means further comprise means for sampling the real part of said summed signal if said input signal is a real signal, an output of said means for sampling being coupled to said means for resolving.

10. The device claimed in claim 1 wherein said regenerating means further comprise threshold means coupled to an output of said means for resolving for obtaining said regenerated signal after said phase ambiguity has been resolved.

11. The device claimed in claim 1 wherein said regenerating means further comprise Viterbi decoding means coupled to an output of said means for resolving for obtaining said regenerated signal after said phase ambiguity has been resolved.

12. A receiving system comprising at least two single-channel or multi-channel coherent demodulation devices as claimed in any one of claims 1, 2 or 3–8 each corresponding to a separate diversity path, and, for said input signal or for each of said input signals, means for regenerating said input signal from summed signals supplied by the summing means of each of said diversity paths, wherein said regeneration means comprise:

means for combining said summed signals to obtain a final combined signal having a maximum gain; and means for resolving the residual static phase ambiguity of said final combined signal, induced by the application, on each of said diversity paths, of said predetermined function.

13. The system claimed in claim 12 wherein said means for combining the summed signals comprise $n_G$ group(s) of means in cascade, where $n_G = n_S - 1$ where $n_S$ is the number of summed signals to be combined ($n_S \geq 2$), each group of means comprising:

phase shifter means for shifting the phase of a first of said summed signals or of a combined signal at the output of a preceding group of means by a value chosen from a predetermined set of values to generate a phase shifted summed signal;

means for adding said phase shifted summed signal to another of said summed signals to generate a combined signal; and means for controlling said phase shifter means assuring a final choice of the phase shift value such that the combined signal has a maximal gain, a group of means receiving the combined signal generated by the preceding group of means only when said control means of said preceding group of means have effected said final choice, the combined signal generated by the final group of means constituting said final combined signal.

14. The system claimed in claim 12 wherein said predetermined set of phase shift values comprises the following values:

0 and $\pi$ if said input signal or each of said input signals is a real signal, or 0, $\pi/2$, $\pi$ and $3\pi/2$ if said input signal or each of said input signals is a complex signal.

* * * * *